United States Patent [19]

Porter et al.

[11] Patent Number: 5,868,923
[45] Date of Patent: Feb. 9, 1999

[54] HYDROCONVERSION PROCESS

[75] Inventors: Michael K. Porter, Cypress, Tex.; Glenn A. Clausen, Bakersfield, Calif.; Jeffery B. Harrison; Ajit K. Bhattacharya, both of Fishkill, N.Y.

[73] Assignee: Texaco Inc, White Plains, N.Y.

[21] Appl. No.: 839,147

[22] Filed: Apr. 23, 1997

Related U.S. Application Data

[63] Continuation-in-part of Ser. No. 798,300, Nov. 22, 1991, abandoned, which is a continuation-in-part of Ser. No. 694,591, May 2, 1991, abandoned.

[51] Int. Cl.$^6$ ................................................ C01G 11/00
[52] U.S. Cl. ..................... 208/113; 208/153; 208/157; 208/216 PP; 208/108; 208/111; 208/112; 208/120; 208/251 H
[58] Field of Search ...................... 208/112, 216 PP, 208/251 H, 113, 153, 157, 120, 108

[56] References Cited

U.S. PATENT DOCUMENTS

| | | | |
|---|---|---|---|
| 2,614,066 | 10/1952 | Cornell | 186/28 |
| 3,694,344 | 9/1972 | Munro | 208/108 |
| 3,694,374 | 9/1972 | Sparks | 252/400 |
| 4,066,530 | 1/1978 | Aldridge et al. | 208/112 |
| 4,077,867 | 3/1978 | Aldridge et al. | 108/10 |
| 4,089,774 | 5/1978 | Oleck et al. | 208/89 |
| 4,125,455 | 11/1978 | Herbstman | 208/108 |
| 4,134,825 | 1/1979 | Bearden, Jr. et al. | 208/108 |
| 4,181,602 | 1/1980 | Quick et al. | 208/216 PP |
| 4,209,685 | 6/1980 | Khulbe et al. | 208/48 |
| 4,224,144 | 9/1980 | Hensley, Jr. et al. | 208/216 PP |
| 4,225,421 | 9/1980 | Hensley, Jr. et al. | 208/216 |
| 4,252,634 | 2/1981 | Khulbe et al. | 208/48 |
| 4,297,242 | 10/1981 | Hensely, Jr. et al. | 252/439 |
| 4,298,454 | 11/1981 | Aldridge et al. | 208/10 |
| 4,299,687 | 11/1981 | Myers et al. | 208/113 |
| 4,306,965 | 12/1981 | Hensley, Jr. et al. | 208/216 PP |
| 4,309,753 | 1/1982 | Negi et al. | 364/200 |
| 4,338,183 | 7/1982 | Gatsis | 208/10 |
| 4,341,625 | 7/1982 | Tamm | 208/216 |
| 4,347,122 | 8/1982 | Myers et al. | 208/113 |
| 4,352,729 | 10/1982 | Jacquin et al. | 208/209 |
| 4,354,923 | 10/1982 | Myers et al. | 208/113 |
| 4,357,263 | 11/1982 | Heck et al. | 252/439 |
| 4,370,221 | 1/1983 | Patmore et al. | 208/112 |
| 4,389,301 | 6/1983 | Dahlberg et al. | 208/59 |
| 4,395,328 | 7/1983 | Hensley, Jr. et al. | 208/251 |
| 4,395,329 | 7/1983 | LePage et al. | 208/251 |
| 4,419,223 | 12/1983 | Myers et al. | 208/120 |
| 4,430,207 | 2/1984 | Kukes | 208/251 |
| 4,432,864 | 2/1984 | Myers et al. | 208/120 |
| 4,434,044 | 2/1984 | Busch et al. | 208/91 |
| 4,435,279 | 3/1984 | Busch et al. | 208/111 |
| 4,444,651 | 4/1984 | Busch et al. | 208/111 |
| 4,464,250 | 8/1984 | Myers et al. | 208/120 |
| 4,495,062 | 1/1985 | Hensley, Jr. et al. | 208/111 |
| 4,520,128 | 5/1985 | Morales et al. | 502/210 |
| 4,548,709 | 10/1985 | Bowes et al. | 208/213 |
| 4,549,957 | 10/1985 | Hensley, Jr. et al. | 208/216 |
| 4,551,230 | 11/1985 | Kukes et al. | 208/89 |
| 4,557,824 | 12/1985 | Kukes et al. | 208/251 |
| 4,564,441 | 1/1986 | Kukes et al. | 208/108 |
| 4,567,154 | 1/1986 | Bearden, Jr. et al. | 502/173 |
| 4,569,753 | 2/1986 | Busch et al. | 208/73 |
| 4,572,778 | 2/1986 | Ward | 208/89 |
| 4,578,181 | 3/1986 | Derouane et al. | 208/110 |
| 4,579,646 | 4/1986 | Grosboll et al. | 208/108 |
| 4,582,120 | 4/1986 | Walters et al. | 165/104.16 |
| 4,605,636 | 8/1986 | Walters et al. | 502/39 |
| 4,652,545 | 3/1987 | Lindsley et al. | 502/255 |
| 4,716,958 | 1/1988 | Walters et al. | 165/142 |
| 4,724,069 | 2/1988 | Aldag, Jr. et al. | 208/217 |
| 4,740,295 | 4/1988 | Bearden, Jr. et al. | 208/421 |
| 4,746,419 | 5/1988 | Peck et al. | 208/213 |
| 4,762,607 | 8/1988 | Aldridge et al. | 208/59 |
| 4,765,882 | 8/1988 | Aldridge et al. | 208/59 |
| 4,778,588 | 10/1988 | Brandes et al. | 208/213 |
| 4,822,761 | 4/1989 | Walters et al. | 502/38 |
| 4,846,961 | 7/1989 | Robinson et al. | 208/216 |
| 4,886,594 | 12/1989 | Miller | 208/210 |
| 4,894,141 | 1/1990 | Busch et al. | 208/73 |
| 4,923,838 | 5/1990 | Khulbe et al. | 502/151 |
| 4,941,964 | 7/1990 | Dai et al. | 208/216 |
| 4,963,247 | 10/1990 | Belinko et al. | 208/112 |
| 5,039,392 | 8/1991 | Bearden, Jr. et al. | 208/112 |
| 5,045,226 | 9/1991 | Richter et al. | 252/182.2 |
| 5,047,142 | 9/1991 | Sherwood, Jr. et al. | 208/251 |
| 5,053,376 | 10/1991 | Bearden, Jr. et al. | 502/150 |
| 5,104,516 | 4/1992 | de Bruijn et al. | 208/107 |
| 5,108,581 | 4/1992 | Aldridge et al. | 208/108 |
| 5,221,656 | 6/1993 | Clark et al. | 502/315 |
| 5,320,743 | 6/1994 | Dai et al. | 208/111 |

(List continued on next page.)

FOREIGN PATENT DOCUMENTS

| | | | |
|---|---|---|---|
| 1124195 | 5/1982 | Canada | 3/34 |
| 1195639 | 10/1985 | Canada | 47/4 |
| 0567272A1 | 10/1993 | European Pat. Off. | C10G 45/08 |
| 0590894A1 | 4/1994 | European Pat. Off. | C10G 45/08 |

OTHER PUBLICATIONS

Mohamed, et al., "Hydrogenation of residual oil using na ore derived water soluble ammonium molybdate catalyst", Fuel, 1991, vol. 70, Aug. pp. 983–987.

R.T. Vanderbilt Company, Inc., Performance Evaluations.

Cotton, et al., Advanced Inorganic Chemistry, Fifth Edition, p. 1226.

Noether, et al., Encyclopedic Dictionary of Chemical Technology, p. 273.

*Primary Examiner*—Helane Myers
*Attorney, Agent, or Firm*—Henry H. Gibson; Arnold White & Durkee

[57] ABSTRACT

An improved ebullated bed hydroconversion process is disclosed that utilizes a bimodal heterogeneous catalyst and a metal containing oil-miscible-catalysts compound to achieve a reduction in sediment, an increase in conversion, a reduction in the energy utilized to maintain reaction conditions and increases the stability of the ebullated catalyst bed. The oil-miscible compound may be provided in a concentration so as to provide about 1 to about 60 wppm metal based on the charge hydrocarbon oil.

26 Claims, 2 Drawing Sheets

U.S. PATENT DOCUMENTS

| | | | |
|---|---|---|---|
| 5,322,617 | 6/1994 | de Bruijn et al. | 208/108 |
| 5,372,705 | 12/1994 | Bhattacharya et al. | 208/112 |
| 5,397,456 | 3/1995 | Dai et al. | 208/108 |
| 5,399,259 | 3/1995 | Dai et al. | 208/216 |
| 5,416,054 | 5/1995 | Dai et al. | 502/211 |
| 5,435,908 | 7/1995 | Nelson et al. | 208/216 |
| 5,445,659 | 8/1995 | Khan et al. | 48/197 |
| 5,457,256 | 10/1995 | Mitariten et al. | 585/655 |
| 5,514,273 | 5/1996 | Sherwood, Jr. et al. | 208/216 |
| 5,545,602 | 8/1996 | Nelson et al. | 502/314 |
| 5,616,530 | 4/1997 | Sherwood, Jr. et al. | 502/210 |

HYDROCONVERSION PROCESS

This application is a continuation-in-part of application Ser. No. 07/798,300 filed Nov. 22, 1991, which is a continuation-in-part of application Ser. No. 07/694,591, filed May 2, 1991 the text of which are incorporated herein by reference both abandoned.

BACKGROUND OF THE INVENTION

1. Field of the Invention

This invention relates to the hydroconversion of heavy hydrocarbon oils. More particularly it relates to a hydroconversion catalyst system which permits operation to be carried out with decreased power consumption and better ebullation in the reactor bed.

2. Background

Often a petroleum refiner wishes to convert high boiling fractions such as vacuum resid to lower boiling fractions which are of higher value and more readily handled and/or marketable. Illustrative of the large body of patents directed to this problem are the following:

U.S. Pat. No. 4,579,646 discloses a bottoms visbreaking hydroconversion process wherein hydrocarbon charge is partially coked, and the coke is contacted within the charge stock with an oil-miscible metal catalyst compound of a metal of Group IV-B, V-B, VII-B, or VIII to yield a hydroconversion catalyst.

U.S. Pat. No. 4,724,069 discloses hydrofining in the presence of a supported catalyst bearing a VI-B, VII-B, or VIII metal on alumina, silica, or silica-alumina. There is introduced with the charge oil, as additive, a naphthenate of Co or Fe.

U.S. Pat. No. 4,567,156 discloses hydroconversion in the presence of a chromium catalyst prepared by adding a water-soluble aliphatic polyhydroxy compound (such as glycerol) to an aqueous solution of chromic acid, adding a hydrocarbon thereto, and heating the mixture in the presence of hydrogen sulfide to yield a slurry.

U.S. Pat. No. 4,564,441 discloses hydrofining in the presence of a decomposable compound of a metal (Cu, Zn, III-B, IV-B, VII-B, or VIII) mixed with a hydrocarbon-containing feed stream; and the mixture is then contacted with a "suitable refractory inorganic material" such as alumina.

U.S. Pat. No. 4,557,823 discloses hydrofining in the presence of a decomposable compound of a IV-B metal and a supported catalyst containing a metal of VI-B, VII-B, or VIII.

U.S. Pat. No. 4,557,824 discloses demetallization in the presence of a decomposable compound of VI-B, VII-B, or VIII metal admitted with the charge and a heterogeneous catalyst containing a phosphate of Zr, Co, or Fe.

U.S. Pat. No. 4,551,230 discloses demetallization in the presence of a decomposable compound of a IV-B, V-B, VI-B, VII-B, or VIII metal admitted with the charge and a heterogeneous catalyst containing $NiAs_x$ on alumina.

U.S. Pat. No. 4,430,207 discloses demetallization in the presence of a decomposable compound of V-B, VI-B, VII-B, or VIII metal admitted with the charge and a heterogeneous catalyst containing a phosphate of Zr or Cr.

U.S. Pat. No. 4,389,301 discloses hydroprocessing in the presence of added dispersed hydrogenation catalyst (typically ammonium molybdate) and added porous contact particles (typically FCC catalyst fines, alumina, or naturally occurring clay).

U.S. Pat. No. 4,352,729 discloses hydrotreating in the presence of a molybdenum blue solution in polar organic solvent introduced with the hydrocarbon charge.

U.S. Pat. No. 4,338,183 discloses liquefaction of coal in the presence of unsupported finely divided metal catalyst.

U.S. Pat. No. 4,298,454 discloses hydroconversion of a coal-oil mixture in the presence of a thermally decomposable compound of a IV-B, V-B, VI-B, VII-B, or VIII metal, preferably Mo.

U.S. Pat. No. 4,134,825 discloses hydroconversion of heavy hydrocarbons in the presence of an oil-miscible compound of IV-B, V-B, VI-B, VII-B, or VIII metal added to charge, the compound being converted to solid, non-colloidal form by heating in the presence of hydrogen.

U.S. Pat. No. 4,125,455 discloses hydrotreating in the presence of a fatty acid salt of a VI-B metal, typically molybdenum octoate.

U.S. Pat. No. 4,077,867 discloses hydroconversion of coal in the presence of oil-miscible compound of V-B, VI-B, VII-B, or VIII metal plus hydrogen donor solvent.

U.S. Pat. No. 4,067,799 discloses hydroconversion in the presence of a metal phthalocyanine plus dispersed iron particles.

U.S. Pat. No. 4,066,530 discloses hydroconversion in the presence of (i) an iron component and (ii) a catalytically active other metal component prepared by dissolving an oil-miscible metal compound in the oil and converting the metal compound in the oil to the corresponding catalytically active metal component.

U.S. Pat. No. 5,108,581 principally discloses hydroconversion in a stirred batch reactor using homogeneous catalytic systems using various metal compounds.

SUMMARY OF THE INVENTION

One aspect of the present invention is generally directed to an ebullated bed hydroconversion process for converting a charge hydrocarbon oil containing a substantial quantity of components boiling above about 1000° F. to a product containing an increased quantity of components boiling below 1000° F. The process includes contacting the charge hydrocarbon oil, with a solid heterogeneous catalyst, the heterogeneous catalyst including elements selected from Groups IV-B, V-B, VI-B, VII-B or VIII of the Periodic Table on a catalyst support, and an oil-miscible catalyst compound in a reaction zone. Hydroconversion conditions in the reaction zone are utilized in the presence of hydrogen and mercaptan, thus the components of the charge hydrocarbon oil boiling above about 1000° F. are converted to components boiling below 1000° F. after which the product is recovered. The improvement of this process by the present invention includes utilizing a heterogeneous catalyst characterized as having a density between about 32 and about 75 $lb/ft^3$, a particle diameter of about 1/64 to about 1/16 inches, a surface area from about 50 to about 500 $m^2/g$, a total pore volume of about 0.2 to about 1.2 cc/g and a pore volume distribution of: 35 to 55% for pore diameters of 0 to 50 Å; 5 to 25% for pore diameters of 50 to 100 Å; 3 to 10% for pore diameters of 100 to 150 Å; and, 25 to 45% for pore diameters greater than 150 Å.

The oil-miscible catalyst compound may be introduced in an amount sufficient to provide metal in an amount from about 1 to about 60 wppm based on the charge hydrocarbon oil. Such an oil-miscible catalyst compound may be selected from the group including: metal salts of aliphatic carboxylic acids, metal salts of naphthenic carboxylic acids, metal salts of alicyclic carboxylic acids, metal salts of aromatic carboxylic acids, metal salts of sulfonic acids, metal salts of sulfinic acids, metal salts of phosphoric acids, metal salts of mercaptans, metal salts of phenols, metal salts of polyhydroxy aromatic compounds, organometallic compounds, metal chelates and metal salts of organic amines, wherein the metal is a element of Groups IV-B, V-B, VI-B, VII-B, or VII of the Periodic Table. Preferably the oil miscible catalyst compound is chosen from the group including cobalt naphthenate, molybdenum hexacarbonyl, molybdenum naphthenate, molybdenum octoate, molybdenum hexanoate and combinations thereof.

Another aspect of the present invention is generally directed to a method of reducing the energy consumed in operating an ebullated bed hydroconversion reaction. This method includes contacting the charge hydrocarbon oil, with a solid heterogeneous catalyst and an oil-miscible catalyst compound in the presence of hydrogen and mercaptan under hydroconversion conditions, so as to convert the components of the charge hydrocarbon oil boiling above about 1000° F. to components boiling below 1000° F.; and, recovering the product. The heterogeneous catalyst may include elements selected from Groups IV-B, V-B, VI-B, VII-B or VIII of the Periodic Table on a catalyst support, and which is characterized as having a density between about 32 and about 75 lb/ft$^3$, a particle diameter of about 1/64 to about 1/16 inches, a surface area from about 50 to about 500 m$^2$/g, a total pore volume of about 0.2 to about 1.2 cc/g and a pore volume distribution of: 35 to 55% for pore diameters of 0 to 50 Å; 5 to 25% for pore diameters of 50 to 100 Å; 3 to 10% for pore diameters of 100 to 150 Å; and, 25 to 45% for pore diameters greater than 150 Å. The oil-miscible catalyst compound is present in an amount sufficient so as to reduce the energy consumed in operating the ebullated bed hydroconversion reaction to a level less than that of the energy utilized in the absence of the oil-miscible catalyst compound. In one embodiment, the oil-miscible catalyst compound is present in an amount sufficient so as to reduce the energy consumed in operating the ebullated bed hydroconversion reaction to a level between about 99% and about 80% that of the energy consumed in the absence of the oil-miscible catalyst compound.

Yet another aspect of the present invention is a method of increasing the operational stability of an ebullated bed hydroconversion process which converts a charge hydrocarbon oil containing a substantial quantity of components boiling above about 1000° F. to a product containing an increased quantity of components boiling below 1000° F. In this aspect, the charge hydrocarbon oil is contacted with a solid heterogeneous catalyst and an oil-miscible catalyst compound in the presence of hydrogen and mercaptan under hydroconversion conditions, so as to convert the components of the charge hydrocarbon oil boiling above about 1000° F. to components boiling below 1000° F. and the product is recovered. The heterogeneous catalyst includes elements selected from Groups IV-B, V-B, VI-B, VII-B or VIII of the Periodic Table on a catalyst support, and is characterized as having a density between about 32 and about 75 lb/ft$^3$, a particle diameter of about 1/64 to about 1/16 inches, a surface area from about 50 to about 500 m$^2$/g, a total pore volume of about 0.2 to about 1.2 cc/g and a pore volume distribution of: 35 to 55% for pore diameters of 0 to 50 Å; 5 to 25% for pore diameters of 50 to 100 Å; 3 to 10% for pore diameters of 100 to 150 Å; and, 25 to 45% for pore diameters greater than 150 Å. The oil-miscible catalyst compound is present in an amount sufficient so as to increase the operational stability of the ebullated bed when compared to the operational stability of the ebullated bed in the absence of the oil-miscible catalyst compound. In one embodiment, the oil-miscible catalyst compound is present in an amount of about 1 to about 60 wppm based on the charge hydrocarbon oil. In another embodiment, the oil-miscible catalyst is present in an amount sufficient to decrease the sediment in the product.

BRIEF DESCRIPTION OF THE DRAWINGS

These and other features of the present invention are more fully set forth in the following description of illustrative embodiments of the invention. The description is presented with reference to the accompanying drawings in which.

DESCRIPTION OF ILLUSTRATIVE EMBODIMENTS

Figure 1A:
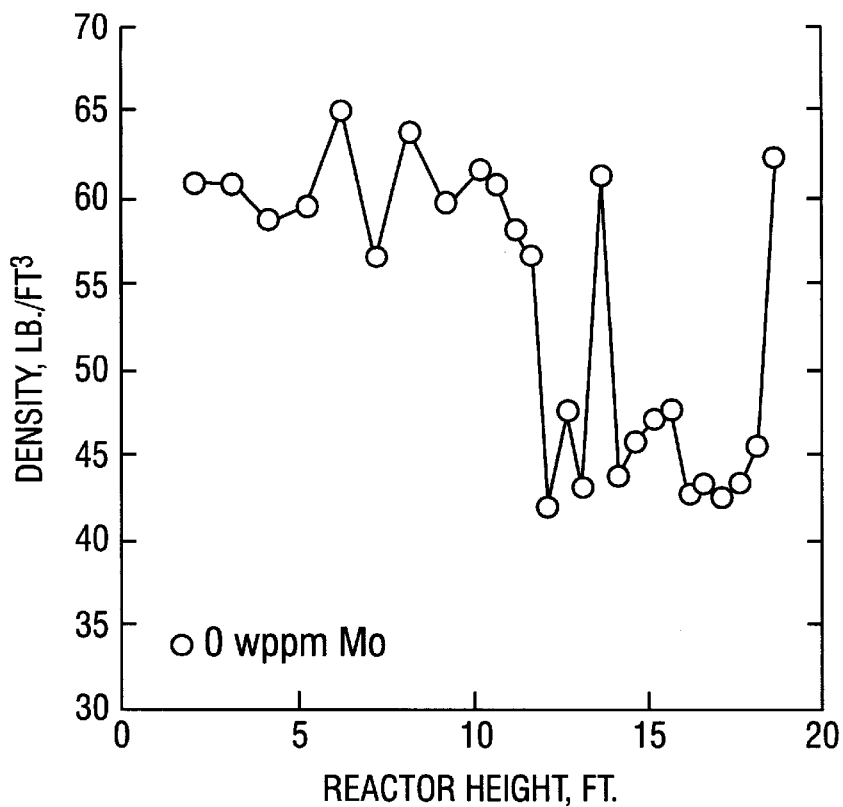
FIGS. 1a and 1b are plots of reactor height verses reactor density of the reactor contents for an ebullated bed hydroconversion reaction having an ebullation rate of about 25.9 gph in the absence of oil-miscible catalyst compound and with oil-miscible catalyst compound at a metal concentration of about 30 wppm.

The charge hydrocarbon oil which may be treated by the process of this invention may include high boiling hydrocarbons typically those having an initial boiling point (ibp) above about 650° F. This process is particularly useful to treat charge hydrocarbons containing a substantial quantity of components boiling above about 1000° F. to convert a substantial portion thereof to components boiling below 1000° F.

Typical of these streams are heavy crude oil, topped crude, atmospheric resid, vacuum resid, asphaltenes, tars, coal liquids, visbreaker bottoms, etc. Illustrative of such charge streams may be a vacuum resid obtained by blending vacuum resid fractions from Alaska North Slope Crude (59v %), Arabian Medium Crude (5v %), Arabian Heavy Crude (27%), and Bonny Light Crude (9v %) having the characteristics listed in Table I:

TABLE I

| PROPERTY | Charge |
| --- | --- |
| API Gravity | 5.8 |
| 1000° F. + (W %) | 93.1 |
| Composition (W %) | |
| C | 84.8 |
| H | 10.09 |
| N | 0.52 |
| S | 3.64 |
| Alcor Microcarbon Residue (McR) (%) | 19.86 |
| n-C$_7$ insolubles (%) | 11.97 |
| Metals content (wppm) | |
| Ni | 52 |
| V | 131 |
| Fe | 9 |
| Cr | 0.7 |
| Na | 5. |

The hydrocarbon oil generally contains undesirable components typified by nitrogen (in amount up to about 1 w %, typically about 0.2 to about 0.8 w %, say about 0.52 w %), sulfur (in amount up to about 10 w %, typically 2 to about 6 w %, say about 3.64 w %), and metals including Ni, V, Fe, Cr, Na, etc. in amounts up to about 900 wppm, typically about 40 to about 400 wppm, say 198 wppm). The undesirable asphaltene content of the charge hydrocarbon may be as high as about 22 w %, typically about 8 to about 16 w %, say 11.97 w % (analyzed as components insoluble in normal heptane).

The API gravity of the charge may be as low as about minus 5, typically about minus 5 to about plus 35, say about 5.8. The content of components boiling above about 1000° F. may be as high as about 100 w %, typically about 50 to about 98+w %, say 93.1 w %. The Alcor MCR Carbon content may be as high as about 30 w %, typically about 15 to about 25 w %, say 19.86 w %.

The charge hydrocarbon oil may be passed to a hydroconversion operation wherein conversion occurs in liquid phase at conversion conditions including about 700° F. to about 850° F., preferably about 750° F. to about 810° F., say 800° F. at hydrogen partial pressure of about 500 to about 5000 psig, preferably about 1500 to about 2500 psig, say 2000 psig.

A catalytically effective amount of oil-miscible, preferably an oil-soluble, catalyst compound of a metal of Group IV-B, V-B, VI-B, VII-B or VIII of the Periodic Table is introduced in the hydroconversion operation. As the term is used herein, the oil-miscible catalyst compounds to be employed may be either oil-miscible or oil soluble, but preferably oil-soluble i.e. they are soluble in the charge hydrocarbon oil in amount of at least about 0.01 g/100 g typically about 0.025 to about 0.25 g/100 g, say about 0.1 g/100 g or alternatively they are readily dispersible in the charge hydrocarbon oil in amount of at least those amounts. The oil-miscible catalyst compounds may, when activated as hereinafter set forth, become oil-miscible or oil soluble in the hydrocarbon oils under the conditions of the hydroconversion process. When the metal is a Group IV-B metal, it may be titanium (Ti), zirconium (Zr), or hafnium (Hf). When the metal is a Group V-B metal, it may be vanadium (V), niobium (Nb), or tantalum (Ta). When the metal is a Group VI-B metal, it may be chromium (Cr), molybdenum (Mo), or tungsten (W). When the metal is a Group VII-B metal, it may be manganese (Mn) or rhenium (Re). When the metal is a Group VIII metal, it may be a non-noble metal such as iron (Fe), cobalt (Co), or nickel (Ni) or a noble metal such as ruthenium (Ru), rhodium (Rh), palladium (Pd), osmium (Os), iridium (Ir), or platinum (Pt). Preferably the metal is a Group VI-B metal—most preferably molybdenum (Mo).

Typical oil-miscible or oil-soluble catalyst compounds include, among others, one or mixtures of the following: metal salts of aliphatic carboxylic acids, for example molybdenum stearate, molybdenum palmitate, molybdenum myristate, molybdenum octoate; metal salts of naphthenic carboxylic acids, for example cobalt naphthenate, iron naphthenate, molybdenum naphthenate; metal salts of alicyclic carboxylic acids, for example molybdenum cyclohexane carboxylate; metal salts of aromatic carboxylic acids, for example cobalt benzoate, cobalt o-methyl benzoate, cobalt m-methyl benzoate, cobalt phthallate, molybdenum p-methyl benzoate; metal salts of sulfonic acids, for example molybdenum benzene sulfonate, cobalt p-toluene sulfonate iron xylene sulfonate; metal salts of sulfinic acids, molybdenum benzene sulfinate iron benzene sulfinate; metal salts of phosphoric acids, for example molybdenum phenyl phosphate; metal salts of mercaptans, for example iron octyl mercaptide, cobalt hexyl mercaptide; metal salts of phenols, for example cobalt phenolate, iron phenolate; metal salts of polyhydroxy aromatic compounds, for example iron catecholate, molybdenum resorcinate; organometallic compounds, for example molybdenum hexacarbonyl, iron hexacarbonyl, cyclopentadienyl molybdenum tricarbonyl; metal chelates, for example ethylene diamine tetra carboxylic acid-di-ferous salt; and metal salts of organic amines, for example cobalt salt of pyrrole. Preferred examples of the above compounds include: cobalt naphthenate, molybdenum hexacarbonyl, molybdenum naphthenate, molybdenum octoate, and molybdenum hexanoate.

It is found that the impact of the oil-miscible catalyst compound may be augmented by use of oil-miscible catalyst compounds of more than one metal. For example if molybdenum (e.g. as the naphthenate) is employed, it is found desirable to add an additional quantity of cobalt (e.g. as the naphthenate). This yields a positive synergistic promotional effect on catalytic desulfurization and demetallization. Typically cobalt may be added in amount of about 0.2 to about 2 moles, say 0.4 moles per mole of molybdenum.

The oil-miscible catalyst compound should be present in amount less than about 60 wppm (i.e. of metal) say about 1 to about 60 wppm based on hydrocarbon oil to be hydroconverted. In one embodiment the amount of oil-miscible catalyst compound should be present in an amount of about 15 to about 45 wppm based on the charge hydrocarbon oil.

It has been unexpectedly found, that the energy consumption utilized in the operation of the ebullated bed process is decreases as the amount of oil-miscible catalyst compound increases. Specifically the total energy (i.e. thermal energy) required to maintain the reaction temperature at set point in the ebullated bed, may be decreased from about 1200 KBTU/BBL (which is the energy consumption at 0 ppm metal) down to a minimum of about 1000 KBTU/BBL. This is an improvement of about 24% in energy saving. This is attained at a conversion of about 61.2v % which is about 11% greater than the base line conversion of about 54.6v %; and it is also noted that the sediment remains about the same.

Figure 1B:
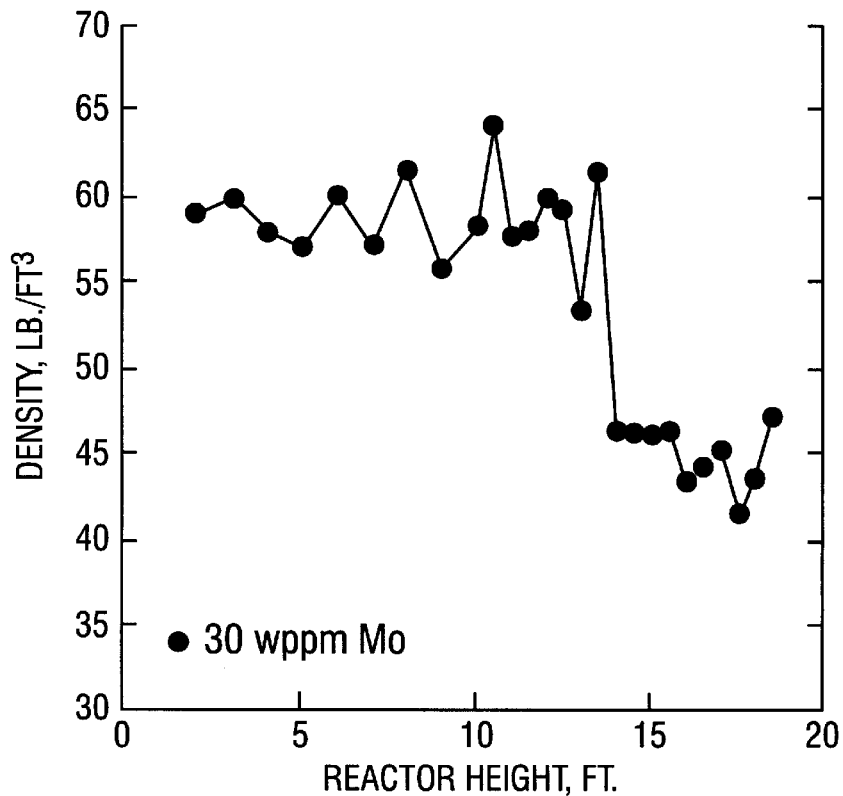
Figure 2A:
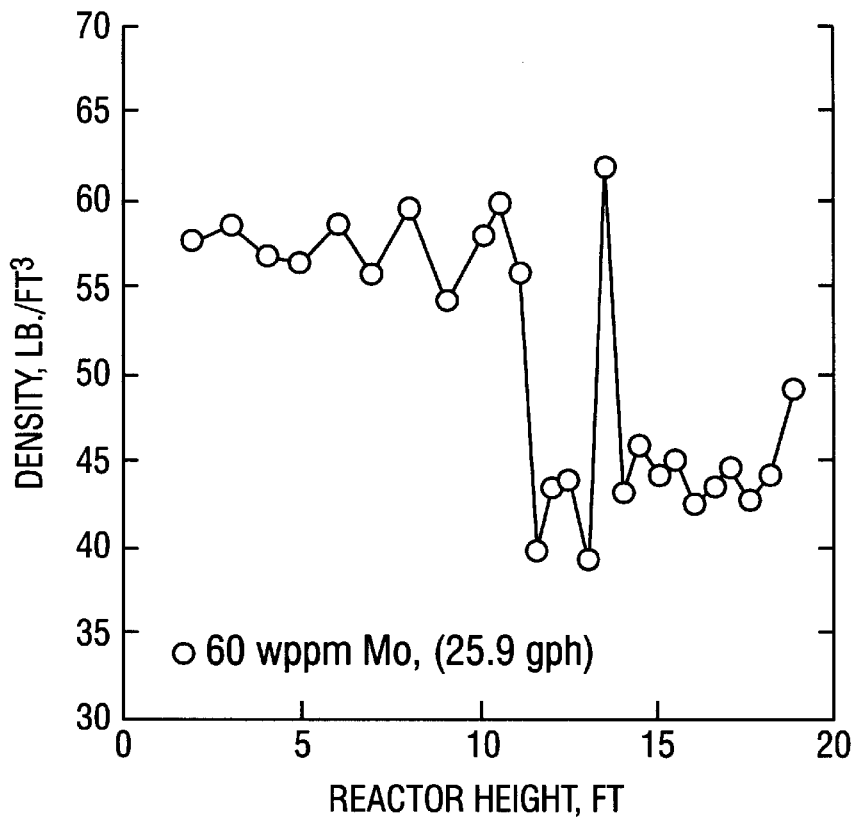
FIGS. 2a and 2b are plots of reactor height verses reactor density of the reactor contents for an ebullated bed hydroconversion reaction in which the amount of oil-miscible catalyst compound is at a metal concentration of about 60 wppm.
Figure 2B:
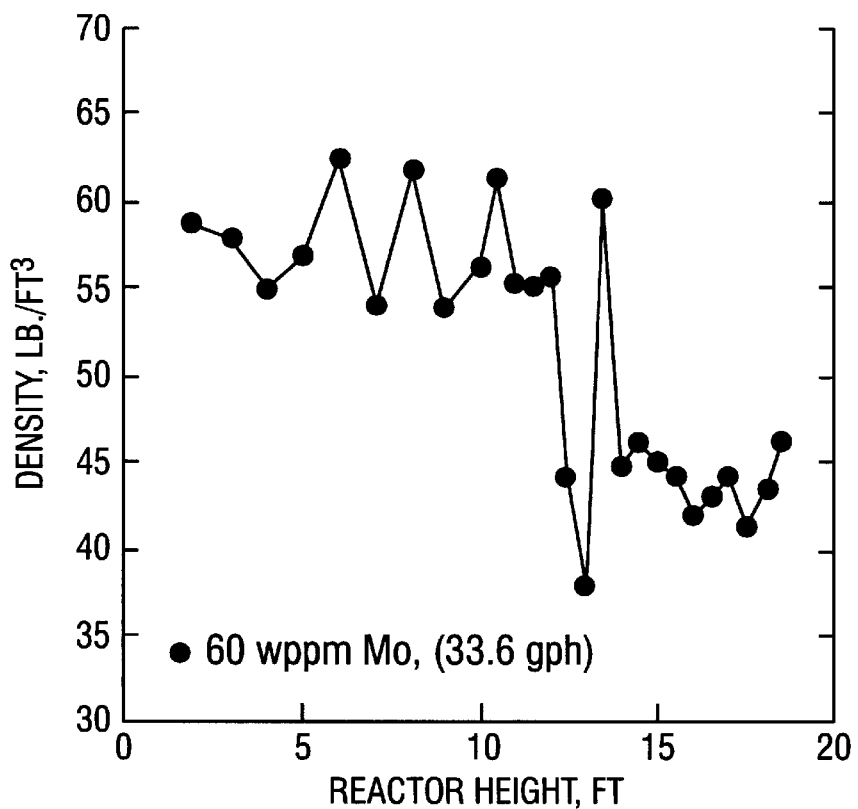

One of skill in the art should know that hydrodynamic environment of an ebullated bed reactor is very complex and is very different from a batch or flow through fixed or stirred bed reactor. In particular variations in the reactor parameters such as the size and shape of the reaction vessel, the catalyst size and density, the flow rates of reactants into the ebullated bed, the rate of product recovery, are just a few among the many parameters that need to be considered if the bed is to be stable and safe to operate. It has also been unexpectedly found that upon addition of the oil-miscible catalyst compound the stability of the ebullated bed hydroconversion reaction is increased. As is shown in FIG. 1a, in the absence of oil-miscible catalyst compound, the ebullated bed utilized in carrying out the hydroconversion process has areas of instability as shown by the peaks and the low reactor bed height. Upon addition of oil-miscible catalyst compounds under generally the same conditions, the ebullated bed becomes more stable as evidenced by the lack of peaks in FIG. 1b and a suitable catalyst bed height of about 13 to about 15 feet. However, it has also been found that an excess of oil-miscible catalyst compound can have a destabilizing effect on the ebullated bed. Upon addition of 60 wppm of oil-miscible catalyst compound, an accumulation of metal on the surface of the heterogeneous catalyst particles is observed. This increase in the molybdenum concentration on the surface of the heterogeneous catalyst particles destabilizes the ebullated bed under approximately the same conditions of those used to generate FIGS. 1a and 1b and cause the catalyst bed height to decrease as shown in FIG. 2a. Rather than operate an unstable reactor, an increase in the ebullation rate from about 25.9 gph to about 33.6 gph was required to expand the catalyst bed to the desired height. (FIG. 2b) Further addition of oil-miscible catalyst compound was not attempted due to the danger of creating an unstable ebullated bed in the hydroconversion reactor. Thus it has been unexpectedly discovered that there exists a previously unknown relationship between the amount of oil-miscible catalyst compound that can be added to the hydrocarbon charge and the stability of an ebullated bed hydroconversion reaction.

In addition to these unexpected results which may be attained in energy consumption and ebullated bed stability, it is particularly significant that an improvement in the level of sediment in the product oils is attained. It has been unexpectedly found that sediment formation in the effluent from the ebullated bed may be minimized by use of oil-miscible metal catalyst compound in amount sufficient to provide a metal content of about 15 to about 45 wppm, preferably about 30 wppm. It is found for example that the sediment in the product oil when about 15 wppm of metal is present is only about (0.037/0.092 or) about 40% of that observed for the base case. Sediment in the effluent from the ebullated bed is measured by IP Test 375/86 entitled Total Sediment Residual Fuel Oils the contents of which are hereby incorporated herein by reference.

It should be apparent to those skilled in the art that the specific amount of soluble metal, present, which may be in an amount of about 1 to about 60 wppm, will depend upon the particular charge hydrocarbon to the ebullated bed, the selection of the catalyst, the reactor design, the level of conversion desired, the level of sediment desired amongst several factors. In any instance, an economic study will permit a ready determination of the desired level of soluble metal to be employed. It is to be noted however that in most instances, while the conversion and the power consumption are significant, it is usually found that the stability of the ebullated bed and the sediment levels in the product will be determinative. The former factor should be apparent to one of skill in the art since reactor stability and safety are very important. The impact of the latter factor should likewise be apparent to one of skill in the art because an undesirable high level of sediment will result in plugging of various pieces of equipment with resulting short run times. This latter factor may be found to be economically controlling-especially when the feed is characterized by a high propensity to generate sediment which can rapidly clog and force the shut down and clean out of the refinery unit.

The oil-miscible catalyst compound may be added by many different reasonable means that should be apparent to one of skill in the art. For example, it is possible to introduce the oil-miscible metal catalyst compound as a solution of or mixture with a highly aromatic heavy oil. The highly aromatic heavy oil which may be employed, typically those oils which contain sulfur such as a heavy cycle gas oil (HCGO), may be characterized as follows:

TABLE II

| Property | Value | | |
| --- | --- | --- | --- |
| | Broad | Narrow | Typical |
| API Gravity Temperature °F. | −5 to 20 | 0–10 | 2 |
| ibp | 500–1000 | 650–850 | 650 |
| 50% | 800–900 | 825–875 | 850 |

TABLE II-continued

| Property | Value | | |
| --- | --- | --- | --- |
| | Broad | Narrow | Typical |
| ep | 1000–1200 | 1000–1100 | 1050 |
| Aromatics Content w % | 25–90 | 30–85 | 85 |
| Sulfur Content w % | 0.5–5 | 2–4 | 3.5 |

Illustrative highly aromatic heavy oils which may be employed may include:

TABLE III

| | Value |
| --- | --- |
| A - Heavy Cycle Gas Oil | |
| API Gravity Temp °F. | −3.0 |
| ibp | 435 |
| 10% | 632 |
| 50% | 762 |
| 90% | 902 |
| ep | 1056 |
| Aromatics Content w % | 85 |
| Sulfur Content w % | 2.5–3.5 |
| B - MP Extract API Gravity | |
| Temp °F. | 8 |
| ibp | 600 |
| ep | 1000 |
| Aromatics Content w % | 50–90 |
| Sulfur Content w % | 3 |
| C - Decant Oil | |
| API Gravity Temp °F. | −2.7 |
| ibp | 525 |
| 10% | 708 |
| 50% | 935 |
| 90% | 975 |
| ep | 1100 |
| Aromatic Content w % | 80 |
| Sulfur Content w % | 1.75 |

The oil-miscible catalyst compound may be added in amount to form a solution/mixture with the heavy oil typically about 0.01 w % to about 0.04 w %, preferably about 0.01 w % to about 0.03 w %, say about 0.02 w %. The oil-miscible catalyst compound may be added to the heavy oil and stored and used in the form of the solution or mixture formed. When this is added to the charge hydrocarbon oil, the amount added may be about 5 w % to about 20 w %, preferably about 15 w %, say about 13 w % of solution/mixture which will provide the about 10 to about 60 wppm of metal desired to effect the results noted previously. Typically, the oil-miscible catalyst compound is added continuously, for example as part of the charge hydrocarbon. However this does not exclude the addition of the oil-miscible catalyst compound as a separate feed stream or in a batch wise manner so as to maintain a fixed level of catalyst compound in the hydroconversion reaction. The oil-miscible catalyst compound may be added at any stage of the hydroconversion reaction, preferably during the first stage of a multi stage reaction.

Activation of the oil-miscible catalyst compound may be effected either by pre-treatment (prior to hydroconversion) or in situ (during hydroconversion). It is preferred to effect activation in situ in the presence of the hydrogenation catalyst to achieve a highly dispersed catalytic species.

Activation may be carried out by adding metal catalyst compound (in amount to provide desired metal content) to charge hydrocarbon at about 60° F. to about 300° F., say about 200° F. The mixture is activated by heating to about 400° F. to about 835° F., typically about 500° F. to about 700° F., say about 600° F. at partial pressure of hydrogen of about 500 to about 5000 psig, typically about 1000 to about 3000 psig, say about 2000 psig and at partial pressure of a gaseous mercaptan of about 5 to about 500 psig, typically about 10 to about 300 psig, say about 50 psig. Total pressure may be about 500 to about 5500 psig, typically about 1000 to about 3300 psig, say about 2650 psig. Commonly the gas-may contain about 40 to about 99v %, typically about 90 to about 99v %, say about 98v % hydrogen and about 1 to about 10v %, say about 2v % mercaptan such as hydrogen sulfide. Time of activation may be about 1 to about 12, typically about 2 to about 6, say about 3 hours. In some cases, activation may occur at temperature which is lower than the temperature of conversion.

The mercaptans which may be employed may include one or more of the following including hydrogen sulfide, aliphatic mercaptans, typified by methyl mercaptan, lauryl mercaptan, etc. aromatic mercaptans; dimethyl disulfide, carbon disulfide, etc. It is believed that the mercaptans at least partially decompose during the activation process. It is not clear why this treatment activates the metal catalyst compound. It may be possible that the activity is generated as a result of metal sulfides formed during the treatment. When the sulfur content of the charge hydrocarbon is above about 2 w %, it may not be necessary to add a mercaptan during activation i.e. hydrodesulfurization of the charge may provide enough mercaptan to properly activate (i.e. sulfide) the oil-miscible decomposable catalyst.

It is possible to activate the oil-miscible metal catalyst compound in the solution/mixture with the heavy aromatic oil. Activation may be effected under the same conditions as are used when activation is carried out in the charge stream. The compatible oil containing the now activated metal may be admitted to the charge stream in amount sufficient to provide therein activated oil-miscible metal catalyst compound in desired amount.

In still another embodiment, activation may be carried out by subjecting the charge hydrocarbon oil containing the oil-miscible metal catalyst compound to hydroconversion conditions including temperature of about 700° F. to about 850° F., preferably about 750° F. to about 810° F., say about 800° F. at hydrogen partial pressure of about 500 to about 5000 psig, preferably about 1500 to about 2000 psig, say 2000 psig, in the presence of a mercaptan but in the absence of heterogeneous hydroconversion catalyst.

In yet a third embodiment activation may be carried out by subjecting the charge hydrocarbon oil containing the oil-miscible catalyst compound to hydroconversion conditions including temperature of about 700° F. to about 850° F., preferably about 750° F. to about 810° F. say 800° F. at hydrogen partial pressure of about 500 to 5,000 psig, preferably about 1,500 to about 2,000 psig, say 2,000 psig, in the presence of mercaptan but in the absence of heterogeneous hydroconversion catalyst.

In yet another embodiment, activation may be carried out during hydroconversion in the presence of the heterogeneous, hydroconversion catalyst, hydrogen and mercaptan.

Hydroconversion is carried out in the presence of solid heterogeneous catalyst containing, as a hydrogenating component, a metal of Group IV-B, V-B, VI-B, VII-B, or VIII on a support which may typically contain carbon or an oxide of aluminum, silicon, titanium, magnesium, or zirconium. Preferably the catalyst may contain a metal of Group VI-B and VIII—typically nickel and molybdenum. When the metal is a Group IV-B metal, it may be titanium (Ti) or zirconium (Zr). When the metal is a Group V-B metal, it may be vanadium (V), niobium (Nb), or tantalum (Ta). When the metal is a Group VI-B metal, it may be chromium (Cr), molybdenum (Mo), or tungsten (W). When the metal is a Group VII-B metal, it may be manganese (Mn) or rhenium (Re). When the metal is a Group VIII metal, it may be a non-noble metal such as iron (Fe), cobalt (Co), or nickel (Ni) or a noble metal such as ruthenium (Ru), rhodium (Rh), palladium (Pd), osmium (Os), iridium. (Ir), or platinum (Pt).

The solid heterogeneous catalyst may also contain, as a promoter, a metal of Groups I-A, I-B, II-A, II-B, or V-A. When the promoter is a metal of Group I-A, it may preferably be sodium (Na) or potassium (K). When the promoter is a metal of Group IB, it may preferably be copper (Cu). When the promoter is a metal of Group II-A, it may be beryllium (Be), magnesium (Mg), calcium (Ca), strontium (Sr), barium (Ba), or radium (Ra). When the promoter is a metal of Group II-B, it may be zinc (Zn), cadmium (Cd), or mercury (Hg). When the promoter is a metal of Group IV-B, it may be titanium (Ti), zirconium (Zr), or hafnium, (Hf). When the promoter is a metal of Group V-A, it may preferably be arsenic (As), antimony (Sb), or bismuth (Bi).

The hydrogenating metal may be loaded onto the solid heterogeneous catalyst by immersing the catalyst support in solution (e.g. ammonium heptamolybdate) for about 2 to about 24 hours, say about 24 hours, followed by drying at about 60° F. to about 300° F., say about 200° F. for about 1 to about 24 hours, say about 8 hours and calcining for about 1 to about 24 hours, say about 3 hours at about 750° F. to about 1100° F., say about 930° F.

The promoter metal may preferably be loaded onto the solid heterogeneous catalyst by immersing the catalyst support (preferably bearing the calcined hydrogenating metal—although they may be added simultaneously or in any order) in solution (e.g. bismuth nitrate) for about 2 to about 24 hours, say about 24 hours, followed by drying at about 60° F. to about 300° F., say about 200° F. for about 1 to about 24 hours, say about 3 hours, and calcining at about 570° F. to about 1100° F., say about 750° F. for about 1 to about 12 hours, say about 3 hours.

The solid heterogeneous catalyst employed in the method of this invention may be characterized by a Total Pore Volume of about 0.2 to about 1.2 cc/g, say about 0.77 cc/g; a surface area of about 50 to about 500 $m^2/g$, say about 280 $m^2/g$. It is preferred that the pore structure of the solid heterogeneous catalyst be bi-modal. In one embodiment of the present invention, the solid heterogeneous catalyst has an approximate pore size distribution as follows:

| Pore Diameter (Å) | Pore Volume (cc/q) | Typically |
|---|---|---|
| 30–100 | 0.15–0.8 | 0.42, |
| 100–1000 | 0.10–0.50 | 0.19 |
| 1000–10,000 | 0.01–0.40 | 0.16 |

In another embodiment, it may have an approximate pore size distribution as follows:

| Pore Diameter (Å) | Pore Volume (cc/q) | Typically |
|---|---|---|
| >250 | 0.12–0.35 | 0.28 |
| >500 | 0.11–0.29 | 0.21 |
| >1500 | 0.08–0.26 | 0.19 |
| >4000 | 0.04–0.18 | 0.11 |

In yet a third embodiment the pore distribution may be approximately as follows:

| Pore Diameter (Å) | Pore Volume (%) | Typically (%) |
|---|---|---|
| 0 to 50 | 35–55 | 43–47 |
| 50 to 100 | 5–25 | 14"18 |
| 100 to 150 | 3–10 | 6–8 |
| greater than 150 | 25–45 | 30–34 |

And in still another embodiment the pore distribution may be approximately as follows:

| Pore Diameter (Å) | Pore Volume (%) | Typically (%) |
|---|---|---|
| 0 to 50 | 42–46 | 45.0 |
| 50 to 100 | 11–17 | 16.0 |
| 100 to 150 | 6–7 | 6.7 |
| greater than 150 | 31–40 | 32.0 |

The pore volume distribution of the solid heterogeneous catalyst utilized in the present invention is very different than that utilized in previous hydroconversion systems in which a oil-miscible catalyst compound is used. An exemplary sample of values are compared with the heterogeneous catalyst of the present invention in Table VI below.

TABLE IV

| | Pore Diameter (Å) | | | | |
|---|---|---|---|---|---|
| U.S. Pat. No. | 0–50 | 50–100 | 100–150 | 150+ | |
| 4,306,965 | 1.5 | 65.3 | 32.2 | 1.0 | % |
| | 1.3 | 53.8 | 43.6 | 1.3 | PORE |
| | 43.9 | 53.3 | 1.1 | 1.1 | VOL- |
| 4,181,602 | 0–10 | 30–80 | | 0–10 | UME |
| 4,224,144 | 43.9 | 53.3 | 1.1 | 1.7 | |
| | 1.5 | 65.3 | 32.2 | 1.0 | |
| | 1.3 | 53.8 | 43.6 | 1.3 | |
| | 20–30 | 30–70 | 0–20 | 0–10 | |
| 4,297,242 | 4.9 | 75 | 19.6 | 0.5 | |
| | 7.5 | 64.4 | 16.2 | 11.9 | |
| | 12.1 | 84.4 | 0.8 | 2.1 | |
| | 4.9 | 58.0 | 33.8 | 2.1 | |
| | 38 | 59.5 | 1.2 | 1.3 | |
| | 5.4 | 69.5 | 24.0 | 1.1 | |
| | 4.0 | 61.8 | 33.0 | 1.2 | |
| | 7.2 | 59.7 | 28.4 | 4.7 | |
| Embodiments of the Present Invention | | | | | |
| | 35–55 | 5–25 | 3–10 | 25–45 | |
| | 43–47 | 14–18 | 6–8 | 30–34 | |
| | 42–46 | 11–17 | 6–7 | 31–40 | |
| | 45.0 | 16.0 | 6.7 | 32.0 | |

Upon review of the above, one of ordinary skill in the art should readily recognize that the catalyst of the present invention has a very different pore volume distribution than those previously found to be suitable. In particular, there is a considerable difference in the percentage of pore volume that is attributable to pores greater than 150 angstroms. It has been unexpectedly found that the combination of the heterogeneous catalysts and the oil-miscible catalyst compounds disclosed herein give many unexpected advantages over previously disclosed catalyst systems. These advantages include a reduction of the formation of sediment in the product, increased conversion of 1000° F.+material in the charge hydrocarbon, reduction in the amount of energy required to operate the ebullated bed hydroconvertion reaction, and increased stability in the ebullated bed, amongst many others that should be apparent to one of ordinary skill in the art.

The solid heterogeneous catalyst typically may contain about 4 to about 30 w %, say 9.5 w % Mo, about 0 to about 6 w %, say 3.1 w % Ni and about 0 to about 6 w %, say 3.1 w % of promoter metal e.g. bismuth. Liquid hourly space velocity (LHSV) in the hydroconversion reactors may be about 0.1 to about 2, say 0.7. Preferably the heterogeneous catalyst may be employed in the form of extrudates of diameter of about 0.7 to about 6.5 mm, say 1 mm and of length of about 0.2 to about 25 mm, say 5 mm.

On a commercial scale, hydroconversion may be carried out in one or more ebullated bed reactors. One of skill in the art should appreciate that such ebullated bed reactors may be 5 to 20 feet in diameter and greater than 50 feet in height, and utilize hundreds, if not thousands of pounds of catalyst. Further, one of skill in the art should recognize that such reactors are very different from small laboratory scale stirred bed batch reactors and that the effect of scaling-up from the laboratory scale to the ebullated bed reactors described herein is inherently unpredictable.

Effluent from hydroconversion is typically characterized by an increase in the content of liquids boiling below 1000° F. Commonly the w % conversion of the 1000° F.+boiling material is about 30% to about 90%, say 67% which is typically about 5% to about 25%, say 12% better than is attained by the prior art techniques. As the term is used herein, conversion is calculated as the percentage of 1000° F.+material in the feed minus the percentage of 1000° F.+material in the Product divided by the percentage of 1000° F.+material in the feed.

One aspect of this invention is that it permits attainment of improved removal of sulfur (HDS Conversion), of nitrogen (HDN Conversion), and of metals (HDNi and HDV Conversion). Typically HDS Conversion may be about 30 to about 90%, say 65% which is about 1% to about 10%, say 4% higher than the control runs. Typically HDN Conversion may be about 20% to about 60%, say 45% which is about 1% to about 10%, say 4% higher than control runs. Typically HDNi plus HDV Conversion may be about 70% to about 99%, say 90% which is about 5% to about 20%, say 13% higher than control runs.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES 1–13

In these Examples oil-miscible catalyst was molybdenum naphthenate in amount to provide about 30 wppm, molybdenum in the feed to the unit in Example 1–9: and as noted in the Table below for Examples 10–13.

The feedstock was a blend of (i) vacuum resid, (ii) visbreaker bottoms, (iii) vacuum bottoms recycle (iv) and heavy cycle gas oil having the following properties:

TABLE V

| Property | Value |
| --- | --- |
| API Gravity | 4.8 |
| >1000° F. w % | 88 |
| Composition w % Leco | |
| C | 75 |
| H | 10.5 |
| N | 0.54 |
| S | 5.0 |
| Alcor Microcarbon Residue (MCR) % | 22.3 |
| n-$C_7$ insolubles w % | 13.5 |
| Metals Content wppm | |
| Ni | 41 |
| V | 17 |
| Fe | 15.0 |
| Cr | 0.2 |
| Na | 5.5 |
| Kinematic Visc. Cst (ASTM D-445) | |
| @ 212° F. | 2368 |
| @ 250° F. | 665 |
| @ 300° F. | 117 |

The feedstock was injected into the reaction zone through a feed heater and injection port. The heavy cycle gas oil containing the oil-miscible molybdenum naphthenate was charged from a separate charge vessel into the reactor. Both the feedstock and the heavy cycle gas oil containing the oil-miscible catalyst compound contacted the ebullated heterogeneous catalyst at about 780° F. and about 2500 psig and about 0.39 LHSV. Hydrogen feed was about 4300 SCFB of about 92% hydrogen.

Supported catalyst in the ebullated bed was cylinders (about 0.8 mm diameter and about 5 mm length) of commercially available catalyst containing about 2.83 w % nickel and about 8.75 w % molybdenum on alumina. Surface area was about 285.2 m²/g and Total Pore Volume was about 0.78 cc/g. Pore Size Distribution was 0.28 cc/g>250 A; 0.21 cc/g>500 A; 0.19 cc/g>1550 A; 0.11 cc/g>4000 A.

The catalyst was activated in situ during hydroconversion.

During hydroconversion, the oil-miscible catalyst (in the heavy cycle gas oil) was pulsed in so that the effect of addition may be observed. The duration of each pulse (i.e. the time during which the oil-miscible catalyst was added) was about 24 hours during which molybdenum (as molybdenum naphthenate) was added to yield a concentration of about 30 ppm of molybdenum based on fresh feed. At the beginning of each pulsed addition, the sediment content (w %) of the product decreased; and over about 1 to about 6 days, it rose again during a decay period. A further pulse over about 24 hours was admitted and then a similar decay period ensued.

A base line (prior to catalyst addition) analysis of conversion (vol %) and sediment (w %) was taken (Example I*); and similar determinations were made at the end of each pulsed addition and at the end of each decay period of about 1 to about 6 days.

In Example 10, the molybdenum (as molybdenum naphthenate) was admitted at a constant rate over about 9 days to yield a molybdenum concentration of about 15 wppm. Then the concentration of molybdenum was increased to about 30 wppm. (for Example 11) and maintained at the new increased level for nine additional days. Similar increases are made after subsequent nine day periods (for Examples 12 and 13) to attain the desired level of molybdenum. During each nine day run, conversion, sediment, and power consumption are measured.

TABLE VI

| Example Pulsed Additions | Conversion | | | Sediment |
| --- | --- | --- | --- | --- |
| | Avg | Max | Max Delta | |
| 1 | 54.6 | | | 0.0923 |
| 2 | 56.5 | 59.9 | 5.3 | |
| 3 | 57.8 | | | |
| 4 | 59.2 | 60.1 | 5.5 | 0.0326 |
| 5 | 54.3 | | | |
| 6 | 58.1 | 58.8 | 4.2 | 0.0342 |
| 7 | 54.4 | | | |
| 8 | 56.9 | 59.7 | 5.1 | 0.0430 |
| 9 | 55.2 | | | |

TABLE VII

| Exampl | Wppm additive | Conversion | | | Sediment | KBTU/ BBL | Energy Con % Baseline Powercon |
| --- | --- | --- | --- | --- | --- | --- | --- |
| | | Avg | Max | Max Delta | | | |
| 1 | 0 | 54.6 | | | 0.0923 | 1200 | 100 |
| 10 | 15 | 54.9 | 56.5 | 1.9 | 0.0356 | 1079 | 90 |
| 11 | 30 | 57.1 | 60.1 | 5.5 | 0.0481 | 1047 | 88 |
| 12 | 45 | 60.8 | 61.2 | 6.2 | 0.0944 | 1006 | 84 |
| 13 | 60 | 61.5 | 61.9 | 6.9 | 0.0800 | 1025 | 80 |

From Table VII above, it should be apparent to one of ordinary skill in the art that a minimum amount of sediment in the product was unexpectedly attained at about 15 wppm of added oil-miscible catalyst. This low level of sediment was attained at a Conversion (54.9v % in Example 10) which was better than the baseline conversion (54.6v %) attained with no addition of oil-miscible catalyst in Example I. In addition the total energy utilized to maintain the hydroconvertion reaction conditions was reduced by about 90% that in the absence of oil-miscible catalyst. It should also be noted that the stability of the ebullated bed has increase upon the addition of the oil-miscible catalyst compound. This was shown in FIG. 1b which shows that the ebullated bed was much more stable than in the absence of oil-miscible catalyst compound (FIG. 1a).

In further view of the above, one of ordinary skill in the art should notice that conversion reached a maximum (61.9v % in Example 13) at about 60 wppm of added oil-miscible catalyst. This high level of conversion was attained at a sediment level (0.0800 w %) which represents an improvement over the baseline of Example 1 (of 0.0923). In addition the energy required to maintain hydroconversion reaction conditions was reduced to an amount 80% that required to maintain the conditions in the absence of the oil-miscible catalyst compound. However, it should be noted that the ebullation rate was increased from about 25.9 gph to about 33.6 gph to maintain a stable catalyst bed when the amount of oil-miscible catalyst was increased so as to achieve an about 60 wppm metal constant. It is believed that the increased deposition of molybdenum on the surface of the heterogeneous catalyst resulted in the need to increase ebulation rate. Levels greater than about 60 wppm were not tested because of the extreme danger of creating an unstable ebullated bed.

EXAMPLES 14–17

In these Examples oil-miscible catalyst compound was molybdenum naphthenate in amount to provide about 30 wppm, molybdenum in the feed to the unit in Example 15 and 17: and was absent in Examples 14 and 16. The solid heterogeneous catalyst utilized in Examples 14 and 15 was the same as that noted above in Examples 1–13. The solid heterogeneous catalyst utilized in examples 16 and 17 had a pore volume distribution as follows: 12.5% for pores less than 100 Å; 73% for pores between 100 and 160 Å; and, 14.5% for pores greater than 250 Å. The results are presented below in Table VIII.

TABLE VIII

| Example No. | 14 | 15 | 16 | 17 |
| --- | --- | --- | --- | --- |
| Oil-miscible Catalyst Injection | No | Yes | No | Yes |
| #1 Reactor Temp. (°F.) | 780 | 780 | 775 | 775 |
| #2 Reactor Temp. (°F.) | 790 | 790 | 785 | 785 |
| Charge Hydrocarbon Space Velocity (V/Hr/V) | 0.41 | 0.41 | 0.41 | 0.41 |
| $H_2$ Partial Pressure (psia) | 2060 | 2060 | 1940 | 1940 |
| Catalyst Age (bbl/lb) | 2.05 | 2.05 | 2.05 | 2.05 |
| IP Sediment in Product (wt %) | 0.12 | 0.048 | 0.28 | 0.13 |
| Conversion (vol %) | 54.8 | 59.8 | 57.7 | 55.3 |
| HDS (wt %) | 69.2 | 68.5 | 75.7 | 74.4 |

Given the above, one of ordinary skill in the art should notice that the presence of oil-miscible catalyst compound reduces the amount of sediment in the product to a lesser extent when the heterogeneous catalyst does not have the pore distributions disclosed herein. It also should be noticed that the level of conversion in Example 16 (57.7) actually decreased in the presence of oil-miscible catalyst Example 17 (55.3). This is in direct contrast with that shown by the heterogeneous catalyst utilized in the present invention which shows an increase in conversion. Lastly in both cases the level of hydrodesulfurization (HDS) decreased in the presence of oil-miscible catalyst. However, the decrease is smaller, when measured as a percentage of value obtained in the absence of oil-miscible catalyst compound, for the heterogeneous catalyst of the present invention (about 1.4%) as opposed to the other catalyst (about 1.7%).

In summary, it is possible to obtain an unexpected improvement in operation (to improve those factors of interest in a particular case) by use of specific quantities of additive oil-miscible catalyst in combination with a solid heterogeneous catalyst as described herein.

While the compositions and methods of this invention have been described in terms of preferred embodiments, it will be apparent to those of skill in the art that variations may be applied to the process described herein without departing from the concept, spirit and scope of the invention. All such similar substitutes and modifications apparent to those skilled in the art are deemed to be within the spirit, scope and concept of the invention as it is set out in the following claims.

What is claimed is:

1. In an ebullated bed hydroconversion process for converting a charge hydrocarbon oil containing a substantial quantity of components boiling above about 1000° F. to a product containing an increased quantity of components boiling below 1000° F., wherein the process includes: contacting said charge hydrocarbon oil, with a solid heterogeneous catalyst, said heterogeneous catalyst including elements selected from Groups IV-B, V-B, VI-B, VII-B or VIII of the Periodic Table on a catalyst support, and an oil-miscible catalyst compound, in a reaction zone under hydroconversion conditions in the presence of hydrogen and mercaptan; converting the components of the charge hydrocarbon oil boiling above about 1000° F. to components boiling below 1000° F.; and, recovering said product, wherein the improvement comprises, utilizing a heterogeneous catalyst characterized as having a density between about 32 and about 75 lb/ft$^3$, a particle diameter of about 1/64 to about 1/16 inches, a surface area from about 50 to about 500 m$^2$/g, a total pore volume of about 0.2 to about 1.2 cc/g and a pore volume distribution of: 35 to 55% for pore diameters of 0 to 50 Å; 5 to 25% for pore diameters of 50 to 100 Å; 3 to 10% for pore diameters of 100 to 150 Å; and, 25 to 45% for pore diameters greater than 150 Å; and, introducing said oil-miscible catalyst compound in an amount sufficient to provide metal in an amount from about 1 to about 60 wppm based on the charge hydrocarbon oil.

2. The method of claim 1 wherein the heterogeneous catalyst is characterized by a pore volume distribution of: 42 to 46% for pore diameters of 0 to 50 Å; 11 to 17% for pore diameters of 50 to 100 Å; 3 to 10% for pore diameters of 100 to 150 Å; and, 25 to 45% for pore diameters greater than 150 Å.

3. The method of claim 1 wherein oil-miscible catalyst compound is selected from the group consisting of: metal salts of aliphatic carboxylic acids, metal salts of naphthenic carboxylic acids, metal salts of alicyclic carboxylic acids, metal salts of aromatic carboxylic acids, metal salts of sulfonic acids, metal salts of sulfinic acids, metal salts of phosphoric acids, metal salts of mercaptans, metal salts of phenols, metal salts of polyhydroxy aromatic compounds, organometallic compounds, metal chelates and metal salts of organic amines, wherein the metal is a element of Groups IV-B, V-B, VI-B, VII-B, or VII of the Periodic Table.

4. The method of claim 1 wherein the oil-miscible catalyst compound is selected from the group consisting of cobalt naphthenate, molybdenum hexacarbonyl, molybdenum naphthenate, molybdenum octoate, molybdenum hexanoate and combinations thereof.

5. The method of claim 1 wherein oil-miscible catalyst compound is present in amount sufficient to provide metal in amount so as to decrease the level of sediment in the product.

6. The method of claim 1 wherein oil-miscible catalyst compound is present in amount of about 15 to about 45 wppm based on the charge hydrocarbon oil.

7. The method of claim 1 wherein oil-miscible catalyst compound is present in amount so that the energy required to operate the ebullated bed hydroconversion reaction at desired reaction conditions is less than about 90% that of the energy consumed in the absence of the catalyst.

8. The method of claim 1 wherein more than one oil-miscible catalyst compound is present.

9. A method of reducing the energy consumed in operating an ebullated bed hydroconversion process for converting a charge hydrocarbon oil containing a substantial quantity of components boiling above about 1000° F. to a product containing an increased quantity of components boiling below 1000° F., comprising:

contacting said charge hydrocarbon oil, with a solid heterogeneous catalyst and an oil-miscible catalyst compound in the presence of hydrogen and mercaptan under hydroconversion conditions, so as to convert the components of the charge hydrocarbon oil boiling above about 1000° F. to components boiling below 1000° F.; and, recovering said product, wherein said heterogeneous catalyst includes elements selected from Groups IV-B, V-B, VI-B, VII-B or VIII of the Periodic Table on a catalyst support, and is characterized as having a density between about 32 and about 75 lb/ft$^3$, a particle diameter of about $\frac{1}{64}$ to about $\frac{1}{16}$ inches, a surface area from about 50 to about 500 m$^2$/g, a total pore volume of about 0.2 to about 1.2 cc/g and a pore volume distribution of: 35 to 55% for pore diameters of 0 to 50 Å; 5 to 25% for pore diameters of 50 to 100 Å; 3 to 10% for pore diameters of 100 to 150 Å; and, 25 to 45% for pore diameters greater than 150 Å; and wherein said oil-miscible catalyst compound is present in an amount sufficient so as to reduce the energy consumed in operating the ebullated bed hydroconversion reaction to a level less than that of the energy consumed in the absence of the oil-miscible catalyst compound.

10. The method of claim 9 wherein the heterogeneous catalyst is characterized by a pore volume distribution of: 42 to 46% for pore diameters of 0 to 50 Å; 11 to 17% for pore diameters of 50 to 100 Å; 3 to 10% for pore diameters of 100 to 150 Å; and, 25 to 45% for pore diameters greater than 150 Å.

11. The method of claim 9 wherein oil-miscible catalyst is selected from the group consisting of: metal salts of aliphatic carboxylic acids, metal salts of naphthenic carboxylic acids, metal salts of alicyclic carboxylic acids, metal salts of aromatic carboxylic acids, metal salts of sulfonic acids, metal salts of sulfinic acids, metal salts of phosphoric acids, metal salts of mercaptans, metal salts of phenols, metal salts of polyhydroxy aromatic compounds, organometallic compounds, metal chelates and metal salts of organic amines, wherein the metal is a element of Groups IV-B, V-B, VI-B, VII-B, or VII of the Periodic Table.

12. The method of claim 11 wherein the oil-miscible catalyst compound is selected from the group consisting of cobalt naphthenate, molybdenum hexacarbonyl, molybdenum naphthenate, molybdenum octoate, molybdenum hexanoate and combinations thereof.

13. The method of claim 9 wherein the oil-miscible catalyst is present in amount of about 1 to about 60 wppm based on the charge hydrocarbon oil.

14. The method of claim 13 wherein the oil-miscible catalyst is present in amount of about 1 to about 45 wppm based on the charge hydrocarbon oil.

15. The method of claim 9 wherein oil-miscible catalyst is present in amount sufficient to provide metal in amount so as to also decrease the sediment in product.

16. The method of claim 9 wherein said oil-miscible catalyst compound is present in an amount sufficient so as to reduce the energy consumed in operating the ebullated bed hydroconversion process to a level between about 99% and about 80% that of the energy consumed in the absence of the oil-miscible catalyst compound.

17. The method of claim 9 wherein more than one oil-miscible catalyst compound is present.

18. A method of increasing the operational stability of an ebullated bed hydroconversion process for converting a charge hydrocarbon oil containing a substantial quantity of components boiling above about 1000° F. to a product containing an increased quantity of components boiling below 1000° F., comprising:

contacting said charge hydrocarbon oil, with a solid heterogeneous catalyst and an oil-miscible catalyst compound in the presence of hydrogen and mercaptan under hydroconversion conditions, so as to convert the components of the charge hydrocarbon oil boiling above about 1000° F. to components boiling below 1000° F.; and, recovering said product, wherein said heterogeneous catalyst includes elements selected from Groups IV-B, V-B, VI-B, VII-B or VIII of the Periodic Table on a catalyst support, and is characterized as having a density between about 32 and about 75 lb/ft$^3$, a particle diameter of about $\frac{1}{64}$ to about $\frac{1}{16}$ inches, a surface area from about 50 to about 500 m$^2$/g, a total pore volume of about 0.2 to about 1.2 cc/g and a pore volume distribution of: 35 to 55% for pore diameters of 0 to 50 Å; 5 to 25% for pore diameters of 50 to 100 Å; 3 to 10% for pore diameters of 100 to 150 Å; and, 25 to 45% for pore diameters greater than 150 Å; and wherein said oil-miscible catalyst compound is present in an amount sufficient so as to increase the operational stability of the ebullated bed when compared to the operational stability of the ebullated bed in the absence of the oil-miscible catalyst compound.

19. The method of claim 18 wherein the heterogeneous catalyst is characterized by a pore volume distribution of: 42 to 46% for pore diameters of 0 to 50 Å; 11 to 17% for pore diameters of 50 to 100 Å; 3 to 10% for pore diameters of 100 to 150 Å; and, 25 to 45% for pore diameters greater than 150 Å.

20. The method of claim 18 wherein oil-miscible catalyst is selected from the group consisting of: metal salts of aliphatic carboxylic acids, metal salts of naphthenic carboxylic acids, metal salts of alicyclic carboxylic acids, metal salts of aromatic carboxylic acids, metal salts of sulfonic acids, metal salts of sulfinic acids, metal salts of phosphoric acids, metal salts of mercaptans, metal salts of phenols, metal salts of polyhydroxy aromatic compounds, organometallic compounds, metal chelates and metal salts of organic amines, wherein the metal is a element of Groups IV-B, V-B, VI-B, VII-B, or VII of the Periodic Table.

21. The method of claim 20 wherein the oil-miscible catalyst compound is selected from the group consisting of cobalt naphthenate, molybdenum hexacarbonyl, molybdenum naphthenate, molybdenum octoate, molybdenum hexanoate and combinations thereof.

22. The method of claim 18 wherein oil-miscible catalyst is present in amount of about 1 to about 60 wppm based on the charge hydrocarbon oil.

23. The method of claim 19 wherein oil-miscible catalyst is present in amount of about 15 to about 45 wppm based on the charge hydrocarbon oil.

24. The method of claim 18 wherein oil-miscible catalyst is present in amount sufficient to provide metal in amount so as to also decrease the sediment in product.

25. The method of claim 18 wherein said oil-miscible catalyst compound is present in an amount sufficient so as to reduce the energy consumed in operating the ebullated bed hydroconversion reaction to a level between about 99% and about 80% that of the energy consumed in the absence of the oil-miscible catalyst compound.

26. The method of claim 18 wherein more than one oil-miscible catalyst is present.

* * * * *